United States Patent Office 3,357,970
Patented Dec. 12, 1967

3,357,970
OXYALKYLATION OF SOLID POLYOLS
Jeffrey M. Ulyatt, Swansea, Glamorgan, Wales, assignor to Chas. Pfizer & Co., Inc., New York, N.Y., a corporation of Delaware
No Drawing. Filed June 4, 1965, Ser. No. 461,553
Claims priority, application Great Britain, June 10, 1964, 24,152/64, 24,153/64
7 Claims. (Cl. 260—209)

This invention relates to the novel production of useful polyether condensation products derived from certain polyhydroxy starting compounds. More particularly, it is concerned with a new and improved method for preparing polyethers from polyhydroxy compounds that contain at least three hydroxy groups in the molecule.

In the past, it has been known that various polyhydroxy compounds like sucrose, which possess the aforementioned requisite number of hydroxy groups, can be reacted with a vicinal lower alkylene oxide at an elevated temperature and in the presence of a basic catalyst to form a polyether condensation product, the molecules of which contain an average of one or more such alkylene oxide units per each hydroxy group of the original polyhydroxy starting compound. These particular polyethers are of value for various purposes and especially for the purpose of manufacturing highly cross-linked plastic materials, such as the rigid polyurethane foams.

In British Patent No. 832,601, there is described a process for oxyalkylating high melting, heat-sensitive polyhydroxy compounds like sucrose, using trimethylamine as catalyst, whereby a useful polyether product is achieved in which at least one mole of the alkylene oxide reagent has reacted with each hydroxyl group of the polyol. This particular process is conducted entirely in the absence of solvent and without melting the starting compound and thus, largely avoids the problems of the prior art encountered with the use of these polyols when they are either fused or dissolved in a suitable solvent, such as water or dimethylsulfoxide. Unfortunately, however, when this reaction is conducted with an appreciable proportion of the polyhydroxy compound being present in the solid phase and this phase is contacted with the liquid alkylene oxide reagent, there is sometimes produced a very sudden initiation of reaction leading to the generation of extremely high pressures, a fact which can often be very disastrous on a large-scale production basis.

In accordance with the present invention, there is now provided for the first time an improved method of obtaining the desired polyether condensation product by means of a process which does not entail the use of large proportions of inert organic solvent or water, or melting the starting polyhydroxy compound, and which circumvents the previously discussed disadvantage of British Patent No. 832,601. This is accomplished by the novel technique of employing at the initiation of reaction between the polyhydroxy compound partly in the solid phase and the vicinal lower alkylene oxide in the liquid phase, a polyether condensation product as the reaction medium therefor, which is itself obtainable by reaction of a polyhydroxy compound containing three or more hydroxy groups in the molecule with a corresponding lower alkylene oxide. By this means, the solid polyhydroxy compound can readily be suspended and so made more easily available for gradual introduction into the mixture and subsequent reaction with the alkylene oxide which becomes dissolved in the reaction medium. Additionally, the polyether product, when used as the reaction medium, also serves as a good and rapid heat transfer agent for this particular reaction. Needless to say, the fact that the reaction medium is a polyether like the desired product obtainable in its absence, renders its presence in the final reaction mixture containing the product not objectionable for the purposes at hand, viz., for the manufacture of rigid polyurethane foams, since it also contains hydroxy-terminated polyether functions of three or more which can undergo further reaction with organic di-isocyanate molecules, etc. Thus, the present method surprisingly provides a very good solution to the problem at hand and also enables good control to be maintained over the reaction itself and the end products required.

In accordance with the process of the present invention, the desired polyether condensation product is formed by reacting a polyhydroxy compound having at least three hydroxy groups in the molecule and being at least partly present in the solid phase with an excess in moles of a vicinal lower alkylene oxide in the presence of a strongly basic organic amine catalyst to yield a relatively homogeneous polyether product, which is then employed as the medium for the reaction of a further and still larger quantity of starting polyhydroxy compound than that used previously with the vicinal alkylene oxide reagent and organic amine catalyst, the polyether product being used only in sufficient amount to suspend the starting polyhydroxy compound in the medium, i.e., to at least form a suitable slurry which is stirrable, and this usually requires not less than about 0.75 part by weight of the polyether per one part by weight of the polyhydroxy compound. The polyether product then obtained has a hydroxyl number which is almost the same as that of the reaction medium, thereby indicating that a uniform product is achieved. Part of this product can now be used for use in the manufacture of rigid polyurethane foams, while the remainder can be employed as diluent in the reaction of more polyhydroxy starting compound with alkylene oxide reagent and amine catalyst to provide more polyether condensation product, again having a hydroxyl number which is not very much unlike that of the diluent. Hence, the process is a continuous one which lends itself very readily to a large-scale plant operation.

In the practice of the process of this invention, the condensation reaction is normally conducted in the presence of a strongly basic organic amine catalyst, as aforesaid, such as a strongly basic organic secondary or tertiary amine, and at a temperature that is in the range of from between about 60° C. up to about 160° C., with a temperature in the range of 90–130° C. being preferred. The pressure is usually superatmospheric, say from about 60 to about 155 p.s.i.g. in order for optimum results to be obtained. Preferred polyhydroxy compounds to be used as starting materials in this reaction include in addition to sucrose, glucose, dextrin, α-methyl-glucoside anhydroenneaheptitol, mannitol, trimethylolethane, pentaerythritol, dipentaerythritol, and the like, although it is only necessary that the substance be a high-melting, heat-sensitive polyol having at least three hydroxy groups in the molecule, i.e., one melting above about 115° C., if at all, and with substantial concurrent decomposition occurring at or near the melting point. Preferred alkylene oxide reagents in this connection include styrene oxide and such lower alkylene oxides as ethylene oxide, 1,2-propylene oxide, 1,2-butylene oxide and 2,3-butylene oxide, etc., as well as mixtures of these. The required basic catalyst can be any strongly basic organic secondary or tertiary amine, like dimethylamine or N-methylpiperidine, as will be more fully explained in the section to follow. Lastly, it should be pointed out that the polyether diluent employed as the reaction medium here in the continuous process should preferably be one which is derived from the same polyhydroxy starting compound as that which is to be oxyalkylated and the same alkylene oxide reagent as that which is to be used as the oxyalkylating agent. In this way, a more uniform product is achieved, i.e., the final product is obtained in a form which is chemically more homogeneous than would ordinarily be the case.

In connection with a more detailed consideration of a preferred feature of this invention, the catalyst to be employed is a strongly basic organic secondary or tertiary amine catalyst in which the carbon atom to which the amino nitrogen is directly attached is part of an aliphatic or cycloaliphatic system. Such amines generally have a dissociation constant in water which is greater than $10^{-5}$. Among the preferred secondary and tertiary amines included in this category are such lower dialkyl and trialkylamines as dimethylamine, trimethylamine, diethylamine, triethylamine, tri-n-propylamine, and so on, as well as heterocyclic amines such as pyrrolidine, piperidine, 4-methylpiperidine, N-methylpiperidine, N-ethylpiperidine, piperazine, N-methylpiperazine, triethylenediamine and tetramethylguanidine, etc. The proportion of amine employed for its catalytic effect here is suitably one within the range of from about 0.2 to about 5% by weight of the polyhydroxy starting material, with the preferred range being in the neighborhood of 0.5-3% by weight thereof. In the case of certain amines such as piperidine, for example, it is even more advantageous to include in the reacting system a small proportion by weight of water so that the induction period for said reaction can be reduced somewhat. Usually, no more than about 0.5-1 mole of water is necessary for these purposes, based on one mole of the starting polyhydroxy compound.

Hence, the present invention, particularly in its application to the production of polyether products from polyhydroxy compounds like sucrose, affords a convenient and facile route to the obtaining of such polyether condensation products which have a high functionality and yet a conveniently low viscosity for use in the manufacture of polyurethane foams. For instance, the desired polyether condensation products obtained here contain from between about one and five oxyalkylene units per each hydroxy group in the original polyhydroxy molecule. From another point of view, this means that they are of the desired hydroxyl number, such as the instant sucrose-derived polyethers of this invention which have a hydroxyl number in the range of from about 300 to about 550. These polyethers and even more preferably, those in the hydroxyl number range of 400-530 lend themselves very readily to the production of rigid polyurethane foams in an excellent manner. This particular aspect of the invention, in turn, depends upon the rather interesting fact that the polyether condensation reaction can be made to stop within a certain narrow range of limits embracing a point corresponding to a very definite proportion of combined alkylene oxide and this, despite the fact that an excess of said reagent is readily available for the reaction.

In summary, therefore, the present invention provides an improved method for preparing a polyether condensation product starting from a heat-sensitive polyhydroxy compound having at least three hydroxy groups in the molecule and melting above about 115° C. by reacting said compound with an excess in moles of a vicinal lower alkylene oxide in the presence of a strongly basic organic amine catalyst and at a temperature that is in the range of from between about 60° C. up to about 160° C. until at least about one mole of the alkylene oxide reagent has reacted with each hydroxy group in the polyhydroxy molecule. The improvement resides in initiating and carrying out said process in the presence of a polyether reaction product of a polyhydroxy compound having at least three hydroxy groups in the molecule and melting above about 115° C. and a vicinal lower alkylene oxide, whereby a more uniform product is achieved, as aforesaid, and this in a safe and continuous manner besides. Further, the amount of polyether product present as reaction medium is usually at least about 0.75 part by weight of the starting polyhydroxy compound employed in said process, and the said polyether is preferably one which is the same as that which is derived by the reaction of said corresponding polyhydroxy starting compound with the same lower alkylene oxide used as reagent to prepare said product.

This invention is further illustrated by the following examples, with Examples I–III, and VIII illustrating the preparation of the polyethers employed in the improved process of the present invention and the remaining examples illustrating said improved process using the aforementioned polyethers. Needless to say, these examples are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

Example I

A stainless-steel reaction vessel fitted with a stirrer, a heating jacket, a cooling coil, an internal thermo-couple and means for introducing reactants was dried, and into it were introduced powdered sucrose (800 g.), propylene oxide (900 g.) and dimethylamine (15 g.).

The vessel was heated to 115° C., at which temperature it was maintained throughout the procedure. After 10 minutes, it was noticed that the pressure (initially 140 p.s.i.g.) was falling, indicating that reaction had begun, and the rate of circulation of coolant liquid had to be increased to maintain the temperature of the system at 115° C. When the pressure had fallen to 70 p.s.i.g., more propylene oxide was introduced to maintain the pressure at this value. After 1000 g. of propylene oxide had been introduced during a further 60 minutes, the pressure rose abruptly (indicating the ending of reaction), and introduction of propylene oxide was stopped. The system was maintained at 115° C. for a further hour, during which time the pressure fell by only 5 units. The excess (vapour phase) propylene oxide was vented from the vessel, and the last traces of propylene oxide were removed from the polyether product by stripping with a nitrogen purge at 100° C. under vacuum for 30 minutes.

The polyether produced was a viscous transparent golden-yellow liquid of hydroxyl number 416. From the hydroxyl number it was calculated that the product had an average of about 1.6 oxypropylene units per original hydroxy group of the sucrose molecule.

Example II

Into the stainless-steel reaction vessel described in Example I, were introduced powdered sucrose (500 g.), propylene oxide (750 g.), piperidine (10 g.) and distilled water (10 g.). The vessel was heated to 115° C. and maintained at this temperature throughout the procedure. After 75 minutes, it was noticed that the pressure within the vessel was falling, and when it had fallen to 100 p.s.i.g., further propylene oxide was added to maintain the pressure at this value. When 1000 g. (approximately) of propylene oxide had been added, the pressure rose abruptly. The system was maintained at 115° C. for a further 30 minutes without any further pressure drop being noticed, and the excess propylene oxide was then vented from the vessel, and the last traces of it were removed from the product by stripping with a nitrogen purge at 100° C. under vacuum for 30 minutes.

The polyether produced was a viscous transparent golden-yellow liquid of hydroxyl number 455. From the hydroxyl number it was calculated that the product had an average of 1.4 oxypropylene units per original hydroxy group of the sucrose molecule.

Example III

Into the stainless-steel reaction vessel described in Example I, were introduced powdered sucrose (500 g.), propylene oxide (750 g.), pyrrolidine (10 ml.) and distilled water (10 g.). The vessel was heated to 115° C. and maintained at this temperature throughout the procedure. After 15 minutes, it was noticed that the pressure was beginning to fall. When the pressure had fallen to 80 p.s.i.g., further oxide was added to restore the pressure to 100 p.s.i.g. and to maintain it at this value. After 800 g. of propylene oxide had been added in this way, the pressure rose abruptly. The excess propylene oxide was removed from the product in the usual way to yield a viscous transparent orange liquid of hydroxyl number 464, this hydroxyl number indicating that about 1.3 oxypropylene groups had been added to each hydroxy group in the original sucrose molecule.

Example IV

The procedure described in Example I was repeated up to the point where the pressure fell by only 5 units. The vessel was then next cooled to 25° C., causing the excess vapour phase propylene oxide to become liquefied. With the reaction vessel at atmospheric pressure, a small sample of the polyether product (which was a clear, viscous pale-yellow liquid) was removed. Unreacted propylene oxide was stripped from the sample, and the sample was subsequently analysed. It was found to have a hydroxyl number of 415.

300 g. of powdered sucrose were added to the remainder of the polyether in the reaction vessel. The vessel was resealed and heated to 115° C., and a vigorous reaction started. The temperature was maintained at 115° C., and the pressure at 100 p.s.i.g. by the addition of further propylene oxide. After 500 g. of oxide had been added in this way, the reaction stopped as indicated by an abrupt rise in pressure. The excess vapour phase propylene oxide was vented from the vessel, and the last traces of oxide were removed from the polyether by stripping with a nitrogen purge under vacuum.

The product was a clear, viscous pale yellow liquid of hydroxyl number 417, i. e., substantially identical to that of the diluent employed. The hydroxyl number of the product indicated that about 1.6 oxypropylene groups had been added to each hydroxy group in the original sucrose molecule.

Example V

A stainless-steel reaction vessel fitted with a stirrer, a heating jacket, a cooling coil, an internal thermo-couple and means for introducing reactants was dried, and into it were introduced powdered sucrose (7 kg.) and a polyether (6 kg.) of hydroxyl number 420 prepared by reacting powdered sucrose with propylene oxide at 115° C. in the presence of dimethylamine as catalyst. The mixture was purged with nitrogen for 45 minutes to remove any dissolved oxygen, and 70 g. of dimethylamine were then added. The reaction vessel was heated to 115° C., and propylene oxide was introduced. When the pressure within the vessel was 60 p.s.i.g., reaction began, and the pressure was maintained between 60 and 100 p.s.i.g. by the addition of further oxide. After 25.5 litres of oxide had been added, the reaction stopped. Excess oxide was vented from the vessel and the product was then stripped with a nitrogen stream under vacuum.

The greater part of the product (hydroxyl number 440) was run out from the vessel, but 7 kg. of the product were left there-in to act as diluent for the next reaction. To this diluent powdered sucrose (7 kg.) was added, the mixture was purged with nitrogen for 45 minutes to remove dissolved oxygen, and 70 g. of dimethylamine were added. The vessel was once again heated to 115° C. and maintained at this temperature, while propylene oxide was pumped in. The reaction started, and coolant water was circulated to keep the temperature at 115° C. The pressure within the vessel varied between 60 and 100 p.s.i.g. during reaction and introduction of propylene oxide. After 26.3 litres had been added, the reaction stopped and no further oxide was introduced. The pressure then stood at 90 p.s.i.g. The product had hydroxyl number 430.

It was found that this reaction cycle could be repeated as often as desired without any apparent deterioration in the quality of the polyether product. With experience, it was found to be possible to minimzie the amount of excess exide remaining in the vessel when the reaction stopped, and this did not materially affect the characteristics of the product. The table below sets out the relevant data and results for the above procedure.

| Run No. | Sucrose Weight, kilos | Propylene oxide vol., litres | Final Pressure (p.s.i.g.) of unused oxide | Hydroxyl No. of product | Oxypropylene groups per sucrose OH |
|---|---|---|---|---|---|
| 1 | 7 | 25.5 | 100 | 440 | 1.46 |
| 2 | 7 | 26.3 | 90 | 430 | 1.51 |
| 3 | 7 | 26.0 | 90 | 430 | |
| 4 | 9.5 | 30.4 | 100 | 440 | |
| 5 | 9.5 | 38.0 | 85 | 420 | 1.57 |
| 6 | 8.2 | 28.0 | 70 | 420 | |
| 7 | 8.2 | 27.0 | 70 | 440 | |
| 8 | 8.2 | 22 | 20 | 420 | |
| 9 | 8.2 | 22 | 45 | 430 | |
| 10 | 8.2 | 22 | 20 | 430 | |

Example VI

Into the reaction vessel described in the previous Examples were introduced powdered sucrose (500 g.), propylene oxide (750 g.), N-methylpiperidine (10 g.) and distilled water (10 g.). The reaction vessel was sealed and heated to 115° C., at which temperature the pressure was 155 p.s.i.g. The reaction vessel was held at 115° C. throughout the procedure. After 30 minutes, the reaction began and further propylene oxide was added to maintain the pressure. The reaction suddenly slowed after a further 40 minutes, by which time approximately 1,000 g. of propylene oxide had been added. The reaction vessel (internal pressure 100 p.s.i.g.) was vented and cooled to about 50° C., and two-thirds of the polyether product (hydroxyl number 412) was removed from the vessel. A further 500 g. of powdered sucrose were added, and the vessel was purged for an hour with nitrogen to remove dissolved oxygen, and 10 g. of N-methylpiperidine and 10 g. of distilled water were then added.

The reaction vessel was heated to 115° C. and propylene oxide was run in until the pressure was 80 p.s.i.g. Reaction then began, and the pressure was maintained at 80–100 p.s.i.g. by the addition of further propylene oxide. After approximately 2000 g. had been added (the pressure was then 100 p.s.i.g.), the reaction stopped. Approximately two-thirds of the polyether product (hydroxyl number 415) was removed as previously described and a further 500 g. of sucrose were added.

By following this procedure, four lots of polyether were prepared in all. The four polyether products were all pale yellow viscous liquids, of hydroxyl number given below:

| Product | Hydroxyl No. | Oxypropylene Groups per Sucrose OH |
|---------|--------------|-----------------------------------|
| 1st     | 412          | 1.61                              |
| 2d      | 415          | 1.59                              |
| 3d      | 400          | 1.68                              |
| 4th     | 413          | 1.60                              |

*Example VII*

Into the reaction vessel described in the previous examples were introduced powdered sucrose (500 g.), a sucrose/propylene oxide polyether diluent (500 g.) of hydroxyl number 530, prepared as described in Example I, but using trimethylamine instead of diethylamine as catalyst, propylene oxide (500 g.), diethylamine (10 g.) and distilled water (10 g.). The vessel was heated to 115° C. and manitained at this temperature throughout the procedure. After 75 minutes, the pressure dropped below the original value of 126 p.s.i.g., and when it had fallen to 100 p.s.i.g. further oxide was added to maintain this pressure. After 800 g. of propylene oxide had been added, the reaction stopped. The excess propylene oxide was vented from the vessel and the last traces of oxide were removed from the product by stripping with a nitrogen purge at 100° C. under vacuum for 30 minutes. The resulting polyether product was a transparent viscous golden-yellow liquid. Some of the product was removed, and to the remainder (500 g.) were added sucrose (500 g.), diethylamine 10 g., propylene oxide (500 g.) and distilled water (10 g.). The vessel was heated to 115° C. and maintained at this temperature while reaction was carried out in a similar manner to that followed in the previous run. The product from this reaction was a transparent viscous golden-yellow liquid, of hydroxyl number 534.

Several more lots of polyether were produced following the above procedure. The hydroxyl numbers of the various lots were as follows:

| Run No. | Hydroxyl No. of product | Oxypropylene groups per sucrose OH |
|---------|-------------------------|-----------------------------------|
| 1       | (¹)                     |                                   |
| 2       | 534                     | 1.07                              |
| 3       | 533                     | 1.07                              |
| 4       | 527                     | 1.10                              |
| 5       | 544                     | 1.04                              |

¹ Not determined.

*Example VIII*

Into the reaction vessel described in the previous examples were introduced α-methylglucoside (500 g.), propylene oxide (600 g.), pyrrolidine (10 ml.) and distilled water (10 ml.). The reaction vessel was sealed and then heated to 115° C., at which temperature the pressure was 135 p.s.i.g. The reaction vessel was held at 115° C. throughout the procedure. After only a few minutes, the reaction began and it became necessary to supply cooling water to the coil in order to control the temperature. As the reaction proceeded, the pressure fell rapidly. When it had fallen to 75 p.s.i.g., propylene oxide was added to the mixture to maintain the pressure at this value. When 740 g. of propylene oxide had been added, it was noticed that the reaction had terminated.

The unreacted propylene oxide was next vented from the reaction vessel and the last traces thereof removed by stripping the product with a nitrogen purge at 100° C. while under vacuum for 30 minutes. The resulting polyether product was a transparent brown, viscous liquid having a hydroxyl number of 429, indicating that the product contained about 1.4 oxypropylene units per original hydroxy group of the α-methylglucoside molecule.

*Example IX*

Into the reaction vessel described in the previous examples were introduced 500 g. of anhydrous powdered pentaerythritol, 500 g. of propylene oxide and 10 ml. of anhydrous dimethylamine. The reaction vessel was sealed and then heated to 115° C., followed by stirring at this temperature. An exceptionally exothermic reaction started immediately and it was only with difficulty that the reaction was maintained at 115° C. When the pressure had fallen to 50 p.s.i.g., further oxide was added to the mixture at this pressure point. When about 840 g. had been added in this way, the reaction terminated suddenly.

The excess propylene oxide was vented from the reactor and the residual volatile material removed therefrom by stripping the polyether product with a stream of nitrogen under vacuum at 100° C. for 30 minutes. The polyether product was a transparent, viscous brown liquid, which possessed a hydroxyl equivalent of 505. The hydroxyl number indicates that an average of 1.33 moles of propylene oxide had condensed per original hydroxy group of the pentaerythritol molecule.

*Example X*

Into the reaction vessel previously described were introduced 800 g. of a sucrose polyether prepared by the procedure described in Example I and 400 g. of sucrose. This mixture was then next purged with nitrogen to remove oxygen dissolved in the system and 12 g. of anhydrous dimethylamine were added. The autoclave was then sealed and the reactants heated to 115° C., while previously purged propylene oxide was added gradually to the system in order to attain a pressure of about 50 p.s.i.g. When about one-third of the propylene oxide that was expected to react had been added to the mixture, the temperature was reduced to 80° C. and the reaction continued at this point until it reached completion. The reaction was considered to be complete when no drop in reaction pressure was noticed during a period of one hour. The excess propylene oxide was vented from the reaction vessel and the residue removed therefrom by stripping the product under vacuum at 100° C. for 30 minutes. The polyether product was a viscous, transparent liquid with a hydroxyl number of 310.

The procedure was repeated again using other final reaction temperatures, and it was found that products with differing hydroxyl numbers were obtained. The results of these studies are set forth below as follows:

| Run No. | Temperature, ° C. | Hydroxyl No. of product | Oxypropylene units per sucrose OH |
|---------|-------------------|-------------------------|-----------------------------------|
| 1       | 70                | 306                     | 2.42                              |
| 2       | 80                | 313                     | 2.35                              |
| 3       | 100               | 381                     | 1.80                              |
| 4       | 115               | 428                     | 1.51                              |

*Example XI*

Into the reaction vessel described in the previous examples were introduced powdered pentaerythritol (750 g.), propylene oxide (750 g.), tetramethylguanidine (7.5 ml.) and distilled water (7.5 ml.). The reaction vessel was then sealed and heated to 115° C., at which temperature the pressure was 135 p.s.i.g. The reaction vessel was held at 115° C. throughout the procedure. After 45 minutes, the reaction began and it became necessary to supply cooling water to the coil in order to control the temperature. As the reaction proceeded, the pressure fell and when it had fallen to 60 p.s.i.g., further propylene oxide was added to maintain the pressure at this value. When 1600 g. of propylene oxide had been added to the mixture, it was noticed that the reaction had terminated. The unreacted propylene oxide was next vented from the reaction vessel and the last traces removed therefrom by stripping the product with a nitrogen purge at 100° C. under vacuum for 30 minutes. The resulting polyether product was a transparent, viscous golden-yellow liquid.

A quantity of the polyether diluent prepared above (500 g.) was then returned to the reaction vessel together with pentaerythritol (500 g.). These materials were purged with nitrogen at atmospheric pressure, as the temperature was raised to remove dissolved oxygen contained therein. When the temperature reached 50° C., the purge was discontinued and tetramethylguanidine (5 ml.) and water (5 ml.) were added. The reaction vessel was then sealed and heated to 115° C. and maintained at this temperature throughout the procedure. Propylene oxide reagent was added at such a rate that the pressure was maintained at 55 p.s.i.g., although it was noticed that a reaction had started when only 100 g. of propylene oxide had been added and the pressure was at 33 p.s.i.g. After 1480 g. of propylene oxide had been added, the reaction stopped and the excess propylene oxide was vented off. The polyether product produced was purified as described above and was a liquid having the same appearance as the diluent.

Several more lots of polyether product were then prepared using the procedure given above. The average hydroxyl numbers of the various lots were found to be as follows:

| Run No. | Hydroxyl No. | Oxypropylene units per pentaerythritol OH |
|---|---|---|
| Diluent | 500 | 1.35 |
| 1 | 485 | 1.45 |
| 2 | 505 | 1.3 |
| 3 | 515 | 1.25 |

Example XII

The procedure described in Example VIII was used to prepare the polyether diluent of hydroxyl number 429. A quantity (500 g.) of this diluent was then returned to the reaction vessel together with α-methylglucoside (500 g.). These materials were then mixed and purged with nitrogen to remove oxygen as the temperature was slowly raised to about 50° C. When this temperature was reached, the purge was discontinued and pyrrolide (10 ml.) and water (10 ml.) were added to the mixture. The temperature was then increased to 115° C. and maintained at this point throughout the reaction. Propylene oxide was next admitted to the vessel rapidly until a pressure of 50 p.s.i.g. was obtained and subsequently maintained at this value by intermittent additions of the oxide. The reaction started immediately after the oxide was admitted to the vessel and proceeded rapidly until 1160 g. of propylene oxide had been fed into the reaction vessel, when it terminated quite suddenly. The unreacted propylene oxide was then vented from the vessel and the last traces removed therefrom by stripping the product with a nitrogen purge at 100° C. under vacuum for 30 minutes. The resulting polyether was a transparent, viscous brown liquid.

Several more lots of polyether were prepared using the procedure described above. The hydroxyl numbers of the various lots were as follows:

| Run No. | Hydroxyl No. | Oxypropylene units per α-methylglucoside OH |
|---|---|---|
| Diluent | 429 | 1.41 |
| 1 | 436 | 1.38 |
| 2 | 422 | 1.45 |
| 3 | 405 | 1.55 |

Example XIII

Into the reaction vessel previously described were introduced 800 g. of a sucrose polyether of hydroxyl number 430 (prepared by the procedure described in Example V) and 400 g. of sucrose. This mixture was then purged with nitrogen to remove any oxygen dissolved in the system and 12 g. of anhydrous dimethylamine was thereafter added. The autoclave was then sealed and the reactants heated to 115° C., and previously purged propylene oxide reagent added gradually to attain a pressure of about 50 p.s.i.g. When about one-third of the propylene oxide that was expected to react had been added to the mixture, the temperature was reduced to 80° C. and the reaction continued at this point until it reached completion. The reaction was considered to be complete when no fall in reaction pressure was noticed during a period of one hour. Excess propylene oxide was next vented from the reaction vessel and the residue removed therefrom by stripping the product under vacuum at 100° C. for 30 minutes. The polyether product obtained was a transparent viscous liquid having a hydroxyl number of 313.

This study was repeated again using other final reaction temperatures in each instance to achieve final products with differing hydroxyl numbers. The results obtained are set forth below in the following table:

| Run No. | Final reaction, t (° C.) | Hydroxyl No. | Oxypropylene units per sucrose OH |
|---|---|---|---|
| 1 | 70 | 306 | 2.4 |
| 2 | 80 | 313 | 2.2 |
| 3 | 100 | 381 | 1.8 |
| 4 | 115 | 428 | 1.5 |

What is claimed is:

1. In a process for preparing a polyether by reacting a heat-sensitive solid polyhydroxy compound having at least four hydroxy groups in the molecule and melting above about 115° C. with an excess in moles of a vicinal lower alkylene oxide of at least three carbon atoms, in the presence of a strongly basic organic amine catalyst, at a temperature of about 60°–160° C. until the number of moles of alkylene oxide which has reacted is in excess of the number of hydroxy groups in the polyhydroxy compound, whereby there is obtained a uniform product which is a polyether condensation product having more than 1, up to about 5, oxyalkylene units per each hydroxy group in the original polyhydroxy molecule, the improvement which comprises initiating and conducting said reaction in a suspension medium for said polyhydroxy compound, said suspension medium being a polyether condensation product of the composition just stated, there being at least about 0.75 parts by weight of said polyether present per part by weight of the polyhydroxy reactant employed in said process.

2. The process of claim 1 wherein the polyether reaction product in which said process is conducted is that which is derived by the aforesaid reaction of the polyhydroxy starting compound with the lower alkylene oxide used as reagents to prepare said product.

3. The process of claim 1 wherein the reaction is conducted as a continuous process by recycling a portion of the polyether reaction product to the reaction mixture to serve as suspension medium for the polyhydroxy compound.

4. The process of claim 1 wherein the polyhydroxy compound is sucrose.

5. The process of claim 1 wherein the polyhydroxy compound is pentaerythritol.

6. The process of claim 1 wherein the polyhydroxy compound is α-methylglucoside.

7. The process of claim 1 wherein the alkylene oxide is 1,2-propylene oxide.

References Cited

UNITED STATES PATENTS 3,190,927   6/1965   Patton et al. _____ 260—209

LEWIS GOTTS, *Primary Examiner.*

JAMES O. THOMAS, JR., *Examiner.*

J. R. BROWN, *Assistant Examiner.*